June 24, 1930.  T. ELLIOTT  1,766,247

SHAFT COUPLING

Filed Oct. 21, 1926

THOMAS ELLIOTT, Inventor

By *[signature]*
Attorney

Patented June 24, 1930

1,766,247

UNITED STATES PATENT OFFICE

THOMAS ELLIOTT, OF BIRMINGHAM, ALABAMA, ASSIGNOR TO CONTINENTAL GIN COMPANY, A CORPORATION OF DELAWARE

SHAFT COUPLING

Application filed October 21, 1926. Serial No. 143,239.

This invention has general reference to devices adapted for use in coupling together, substantially in axial alignment, a plurality of sections of shafting or the like, and relates more particularly to such shaft-couplings in connection with which no keys or other equivalent members are required.

A primary object of my present invention is to produce a keyless shaft-coupling which shall be of extremely simple construction and of exceptional strength in proportion to its size, shall be highly efficient and durable in use, and shall comprise a minimum number of working parts that differ in shape or dimensions.

A further object is to provide such a coupling which comprises a resilient sleeve member adapted to engage the opposed ends of the two shaft sections to be coupled, such sleeve member preferably being of one-piece construction, having longitudinal slits in its side wall, and each of said slits being of less length than the sleeve member; and there being at each end of said sleeve member two co-acting gripping members, each adapted to be effective in clamping the sleeve upon the shaft, while the gripping members at one end of the sleeve are independent of those at its other end.

Another object is to apply the coupling to the shaft sections by interposing between the pair of gripping members at each end of the sleeve screw means adapted to thrust the engaged members apart against wedge surfaces on the sleeve.

And a still further object is to provide such a coupling with the sleeve member reduced between its ends to provide opposed wedge faces and with a bushing interposed between each of the solid gripping rings and said sleeve member, said bushings being slidably movable relative to said sleeve member and preferably also engaged by the thrust screw means used to apply the coupling.

The means by which the foregoing and other objects are accomplished by my invention, and the manner of their accomplishment, readily will be understood from the following description on reference to the accompanying drawings, which depict a preferred embodiment of the invention, and in which:—

Figure 1:
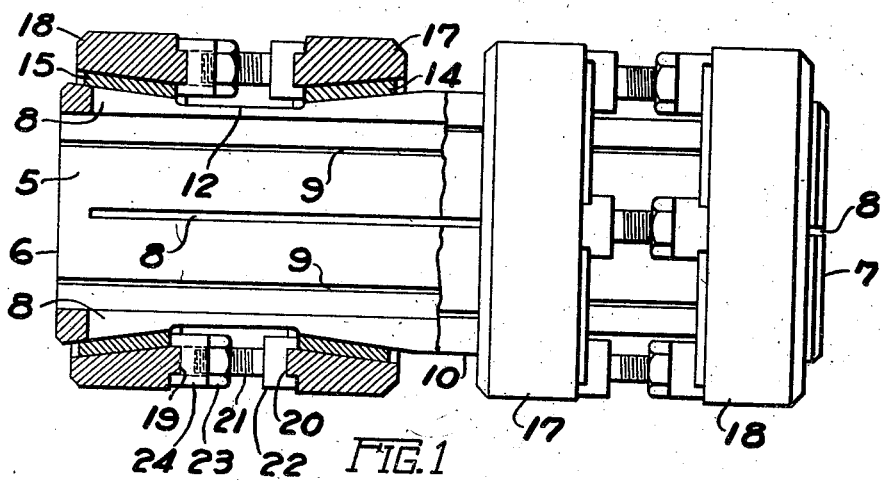
Fig. 1 is a view of my improved shaft-coupling, partly in sectional side elevation, and partly in side elevation.
Figure 2:
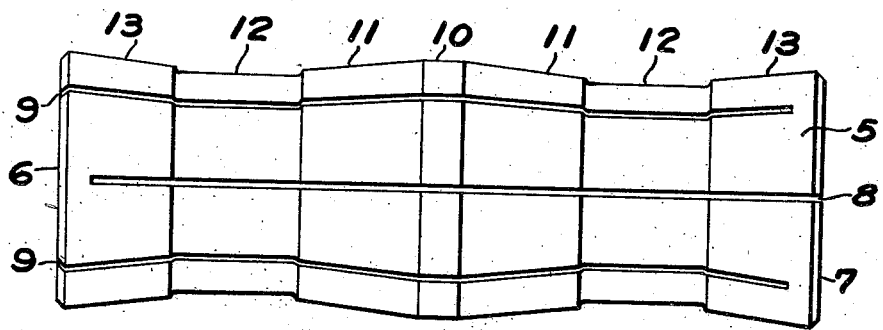
Fig. 2 is a side elevation of the resilient sleeve that constitutes the innermost member of the coupling.

As shown in the drawings, in which like parts are indicated by corresponding reference characters throughout the several views, the sleeve 5 is normally of substantially uniform, cylindrical interior cross-section from its end 6 to its opposite end 7, and has extending through its shell a plurality of slits 8 and 9, uniformly spaced apart and disposed parallel with the longitudinal center line of the sleeve. Slits 8 alternate with slits 9, the former terminating at an appreciable distance from end 6 of the sleeve, and slits 9 similarly terminating before they reach end 7. By this staggered arrangement of the slits, the desired resiliency of the sleeve is secured, while at the same time it remains in one piece. The drawings show four of the slits 8, and the same number of slits 9, in what may be termed the two sets of slits, and I have found in practice that this is a desirable number to use, but it is manifest that a greater or less number may be employed if preferred. However, the number of slits in each set should be the same, and should be a multiple of 2, so that each slit of a set may be located diametrically opposite another slit of the same set.

From an annular portion 10 at its middle, the sleeve 5 tapers uniformly inward toward each end, thereby forming plane-faced frusto-conical surfaces 11, the respective ones of which extend to similar annular recesses 12, beyond which the sleeve tapers uniformly outward toward each end to form plane-faced frusto-conical surfaces 13, which preferably are of substantially the same shape and dimensions as the surfaces 11. Thus, the thickness of the shell of the sleeve is greatest at and near its middle portion and at and near its ends.

Figure 3:
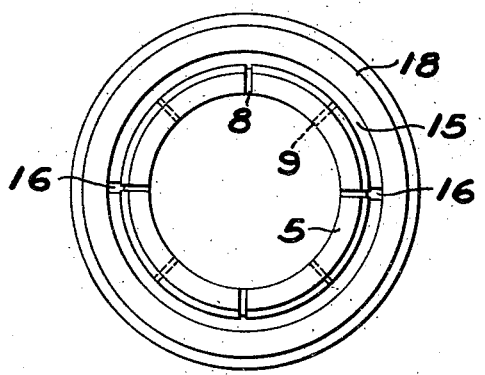
Fig. 3 is an end elevation of the assembled coupling shown in Fig. 1.

Over each of the surfaces 11 is mounted a frusto-conical bushing 14, the inner and outer walls of which are parallel with each other and with the respective ones of said surfaces; and over each of the surfaces 13 is mounted a similar bushing 15. As clearly indicated at 16 in Fig. 3, said bushings are split, so as to adapt them readily to be put into place.

Over each of the bushings 14 is a unitary ring or annular disc 17, which constitutes one of the gripping or clamping members, the inner surface of said ring being so shaped and dimensioned as to conform to the outer surface of said bushing, while the outer surface of the ring preferably is cylindrical; and over each of the bushings 15 is a similar ring 18, the thickest ends of said rings being opposed to each other. Similar annular ribs or shoulders, 19 and 20 respectively, of less outside diameter than the rings, project from said opposed ends, and between said rings a plurality of bolts 21 are interposed, four thereof being indicated in the drawings as being the number I prefer to employ with couplings intended for comparatively small shafts, but their number of course being subject to variation to suit different conditions of use of the coupling; said bolts being uniformly spaced circumferentially of the rings, and being disposed parallel with the axis of the coupling. Each of the bolts 21 has a square head 22, the top of which is grooved for detachable engagement with the shoulder 20; the bolt is screw-threaded to receive a nut 23, which preferably is hexagonal; and beyond said nut the bolt is slidably entered in a smooth axial opening provided therefor in a rectangular block 24, of substantially the same diameter as the bolt-head 22, but of greater length, and having its outer end suitably grooved for engagement with the shoulder 19.

The least interior diameter of the rings 19 and 20 is somewhat greater than the greatest external diameter of the ends of the sleeve, so that said rings may be slipped loosely over said sleeve to their respective positions. Therefore, the parts of my improved shaft-coupling readily may be assembled in the following manner, reference being made to one end only of the coupling, since it is manifest that the parts at the other end would be put in place in the same way: the split bushing 14 having been placed in approximately the position indicated in Fig. 1, the ring 17 is slipped over the end of the sleeve 5 and into place over said bushing; the ring 18 is then slipped over the end of the sleeve, and is advanced toward ring 17 a sufficient distance to permit the split bushing 15 to be placed in approximately the position indicated in Fig. 1, after which ring 17 is moved back to position over said bushing; the nut 23 on each of the bolts 21 having been retracted sufficiently to permit said bolts to be inserted between rings 17 and 18, with the grooves in the heads 22 and those in the blocks 24 embracing the respective ones of the annular shoulders 20 and 19, and said bolts having been suitably spaced and aligned, the nuts 23 are tightened against the blocks 24 sufficiently to retain all of the parts in place until the ends of the two shafts sections to be coupled are inserted into the sleeve 5 of the coupling. When the nuts 23 are further tightened to clamp the sleeve with the desired degree of tightness upon the ends of the two shaft sections, the spacing or alignment of the bolts 21 may, if necessary or desirable, be adjusted. Sufficient clearance for the nuts 23 is provided by the annular recesses 12 to allow for the use of a wrench or other suitable tool in turning said nuts.

It will be noted that the parts at one end of the sleeve 5 preferably are exact duplicates of those at its other end, and that bushings 14 preferably are exact duplicates of bushings 15 and rings 17 preferably are exact duplicates of rings 18; hence, considering each bolt 21 with its nut 23 and its block 24 as a unit, there are only four different parts to the complete coupling. Also, the entire separation of the clamping members at one end of the sleeve from those at its other end simplifies, and minimizes the cost of, repairs and replacements, and lessens the likelihood of failure of the coupling as a whole, due to the weakening or failure of one of its parts.

Various modifications of minor details of my improved shaft-coupling doubtless readily will suggest themselves to those skilled in the art to which it appertains, but such modifications fall within the scope of my inventive rights, and my invention is not to be construed as being limited to any details not specifically set out in the appended claim.

Having thus fully disclosed the invention, what I claim as new, and seek to secure by Letters Patent, is:—

A shaft coupling for the opposed ends of alined shafts comprising a slit sleeve adapted to be gripped about said opposed ends, each end portion of the sleeve having its outer periphery formed to define opposed frusta of cones with the outer ends of the sleeve forming the bases of the outer frusta, the opposed frusta at one end portion of the sleeve adapted to surround the end of one of the opposed shafts and the other opposed frusta the end of the other shaft, an annular member surrounding each cone and of greater diameter than the frusta cones, a split frusto-conical bushing between each of the members and its associated cone, and screw means between each pair of members at the end portions of the coupling sleeve to spread said members apart and cause the bushings to bear against the sleeve and grip it tightly about the ends of the shafts.

In testimony whereof I affix my signature.

THOMAS ELLIOTT.